United States Patent
Poteet et al.

(10) Patent No.: US 11,536,662 B2
(45) Date of Patent: Dec. 27, 2022

(54) METHODS FOR DETECTING ANTIMICROBIAL SURFACE COATINGS USING FLUORESCENT INDICATORS

(71) Applicant: B/E Aerospace, Inc., Winston-Salem, NC (US)

(72) Inventors: Steven Poteet, Ashland, MA (US); Thomas Martz, Winston-Salem, NC (US); Bradford D'Alessio, Winston-Salem, NC (US); David C. McConnell, Winston Salem, NC (US); Vijay V. Pujar, Rancho Santa Fe, CA (US); Katherine Urena Pimentel, Manchester, CT (US); Irene Rexwinkle, Mill Creek, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 118 days.

(21) Appl. No.: 17/071,781

(22) Filed: Oct. 15, 2020

(65) Prior Publication Data

US 2021/0404959 A1 Dec. 30, 2021

Related U.S. Application Data

(60) Provisional application No. 63/062,855, filed on Aug. 7, 2020, provisional application No. 63/043,661, filed on Jun. 24, 2020.

(51) Int. Cl.
*G01N 21/64* (2006.01)
*C09D 7/61* (2018.01)
*G01N 21/84* (2006.01)

(52) U.S. Cl.
CPC ............ *G01N 21/643* (2013.01); *C09D 7/61* (2018.01); *G01N 21/6428* (2013.01);
(Continued)

(58) Field of Classification Search
CPC ............ C09D 7/61; G01N 2021/6497; G01N 2021/8427; G01N 2021/8433;
(Continued)

(56) References Cited

U.S. PATENT DOCUMENTS

| 6,864,489 B2 * | 3/2005 | Chen ....................... G01N 3/56 356/417 |
| 7,304,022 B2 | 12/2007 | Cheung et al. |

(Continued)

FOREIGN PATENT DOCUMENTS

| CN | 108586751 A | 9/2018 |
| CN | 110044913 A | 7/2019 |

(Continued)

OTHER PUBLICATIONS

Extended Search Report for European Application No. 21181532.9 dated Oct. 28, 2021, 12 pages.

(Continued)

*Primary Examiner* — Maureen Wallenhorst
(74) *Attorney, Agent, or Firm* — Suiter Swantz pc llo

(57) ABSTRACT

Disclosed are methods for detecting a presence or absence of an antimicrobial surface coating including applying at least one detectable fluorophoric dye compound to a substrate, irradiating the surface of the substrate with ultraviolet radiation in the 100-415 nm wavelength range to excite the detectable fluorophoric dye compound, observing fluorescence of the excited fluorophoric dye compound, and determining the presence or absence of the antimicrobial surface coating based on the observed fluorescence. Further disclosed are antimicrobial surface coating solutions, methods for their application, and methods for confirming the presence and coverage of antimicrobial surface coatings.

6 Claims, 3 Drawing Sheets

(52) U.S. Cl.
CPC ..... *G01N 21/6447* (2013.01); *G01N 21/8422* (2013.01); *G01N 2021/6497* (2013.01); *G01N 2021/8433* (2013.01)

(58) Field of Classification Search
CPC ............. G01N 21/6428; G01N 21/643; G01N 21/6447; G01N 21/8422
USPC ............ 436/164, 166, 172; 422/82.05, 82.08
See application file for complete search history.

(56) References Cited

U.S. PATENT DOCUMENTS

| | | | |
|---|---|---|---|
| 8,263,061 | B2 | 9/2012 | O'Lenick et al. |
| 8,519,360 | B2 | 8/2013 | Schoening et al. |
| 8,999,357 | B2 | 4/2015 | Elfersy et al. |
| 9,095,731 | B2 | 8/2015 | Gentle et al. |
| 9,810,630 | B1 | 11/2017 | Wegner et al. |
| 10,031,081 | B2 | 7/2018 | Li et al. |
| 2003/0147925 | A1* | 8/2003 | Sawan ................ A01N 47/44 514/210.09 |
| 2010/0003198 | A1* | 1/2010 | Stolmeier ............ A61K 31/045 424/10.3 |
| 2010/0172948 | A1* | 7/2010 | Redler ................ C09D 5/1662 424/411 |
| 2014/0366918 | A1 | 12/2014 | Pech et al. |
| 2016/0002525 | A1 | 1/2016 | Wegner et al. |
| 2017/0189318 | A1 | 7/2017 | Higgins |
| 2017/0232125 | A1 | 8/2017 | Carling |
| 2017/0273307 | A1* | 9/2017 | Narine ................ C09D 5/14 |
| 2018/0362893 | A1 | 12/2018 | Breckwoldt et al. |
| 2018/0368648 | A1* | 12/2018 | Grossman .............. A01N 55/00 |
| 2019/0313641 | A1 | 10/2019 | Preda et al. |
| 2019/0367843 | A1 | 12/2019 | Daddona, III et al. |
| 2020/0240935 | A1* | 7/2020 | Asgari ................ G01B 15/02 |
| 2021/0278343 | A1* | 9/2021 | Rosen ................ A01N 43/32 |
| 2021/0388217 | A1* | 12/2021 | Gurvich ............... A01N 61/00 |

FOREIGN PATENT DOCUMENTS

| | | |
|---|---|---|
| EP | 0424703 A2 | 5/1991 |
| EP | 1895969 A2 | 3/2008 |
| KR | 1020090031551 A | 3/2009 |
| WO | 2008157323 A1 | 12/2008 |

OTHER PUBLICATIONS

Extended Search Report for European Application No. 21184084.8 dated Nov. 8, 2021, 12 pages.

Liu Yixian et al:"Synthesis of VO2/Poly(MMA-co-dMEMUABr) antimicrobial/thermochromic dual-functional coatings", Progress in Organic Coatings, Elsevier BV, NL, vol. 142, Feb. 14, 2020 (Feb. 14, 2020), XP086089518, ISSN: 0300-9440, DOI: 10.1016/J. PORGCOAT.2020.105589.

Lukasz M. Porosa et al:"Synthesis, structures and properties of self-assembling quaternary ammonium dansyl fluorescent tags for porous and non-porous surfaces", Journal of Materials Chemistry. B, vol. 2, No. 11, 2014, p. 1509, XP055280973, GB ISSN: 2050-750X, DOI: 10.1039/c3tb21633k.

Shum Rachel L. et al: "UV-Cu rable Surface-Attached Antimicrobial Polymeric Onium Coatings: Designing Effective, Solvent-Resistant Coatings for Plastic Surfaces", ACS Applied Bio Materials, vol. 3, No. 7, Jun. 9, 2020 (Jun. 9, 2020), pp. 4302-4315, XP055851710, us ISSN: 2576-6422, DOI:10.1021/acsabm. 0c00359.

Sjollema Jelmer et al: "In vitromethods for the evaluation of antimicrobial surface designs", Acta Biomaterialia, Elsevier, Amsterdam , NL,vol. 70, Feb. 10, 2018 (Feb. 10, 2018), pp. 12-24, XP085367324, ISSN: 1742-7061, DOI: 10.1016/J.ACTBIO.2018. 02.001.

* cited by examiner

METHODS FOR DETECTING ANTIMICROBIAL SURFACE COATINGS USING FLUORESCENT INDICATORS

CROSS-REFERENCE TO RELATED APPLICATIONS

This nonprovisional patent application claims the benefit of U.S. Provisional Application No. 63/043,661 filed Jun. 24, 2020 and entitled "METHOD FOR DETECTION AND TAGGING OF ANTIMICROBIAL COATED SURFACES", and U.S. Provisional Application No. 63/062,855 filed Aug. 7, 2020 and entitled "ANTIMICROBIAL COATING CONTAINING FLUORESCENT INDICATOR AND COATING DETECTION METHODS", the disclosures of which are incorporated by reference herein in their entirety.

TECHNICAL FIELD

The present disclosure is directed generally to antimicrobials and more particularly to antimicrobial surface coatings and methods for detecting a presence or absence of an antimicrobial surface coating using a fluorescent indicator.

BACKGROUND

It is well known that various surfaces can harbor microbes. It is also well known that contact with contaminated surfaces can spread infectious agents such as bacteria and viruses. For example, high-contact interior surfaces in a conveyance such as a passenger aircraft have a high potential to transfer microbes between passengers. While these high-contact surfaces can be disinfected during regular cleanings, comprehensive cleaning and sterilization solutions can be time-consuming. Further, there remains the potential for microbe transfer between cleanings. This potential can be alleviated using antimicrobial surface coatings. While effective, antimicrobial surface coatings can degrade and wear away over time and therefore must be checked to ensure their continued presence and reapplied, as necessary.

Quaternary ammonium compounds (QACs) are commonly used in antimicrobial surface coatings due to their ability to neutralize microbes. That same ability can also be used to bond anionic dyes, for instance bromophenol blue (BPB), to detect the presence of antimicrobial coatings via dye bonding and visual inspection. While effective, the process of bonding visible dyes to surface coatings can permanently stain the surface under test and are reliant on absorbance, which is not inherently sensitive.

Therefore, what is needed are methods for detecting the presence or absence of antimicrobial surface coatings without the need for complicated procedures and without any negative effect on the cosmetic appearance of the coated surface, while having the sensitivity to detect even monolayers of coating.

BRIEF SUMMARY

To achieve the foregoing and other advantages, in a first aspect the present disclosure provides a method for detecting the presence or absence of an antimicrobial surface coating. In embodiments, the method includes providing a substrate to be tested, applying a detectable fluorophoric dye compound to a surface of the substrate, irradiating the surface of the substrate with ultraviolet radiation in the 100-415 nm wavelength range to excite the detectable fluorophoric dye compound, observing fluorescence corresponding to the excited, detectable fluorophoric dye compound, and determining, based on the observed fluorescence, a presence or absence of an antimicrobial surface coating.

In some embodiments, the method may further include the step of pre-treating the substrate with an antimicrobial surface coating solution comprising an antimicrobial component configured to covalently bond to the substrate.

In some embodiments, the step of applying the detectable fluorophoric dye compound to the surface of the substrate may include the steps of depositing the detectable fluorophoric dye compound on the surface of the substrate, allowing the detectable fluorophoric dye compound to stand on the surface of the substrate for at least 30 seconds, removing excess detectable fluorophoric dye compound, and drying the substrate.

In some embodiments, the detectable fluorophoric dye compound may be provided as a water-based or alcohol-based solution.

In some embodiments, the substrate may be associated with a passenger cabin of a conveyance, for instance an aircraft, train, subway, bus, automobile, or vessel.

In some embodiments, the substrate may be an element of a passenger seat, a passenger suite, a passenger amenity, a control unit, a closet or stowage/luggage bin, a lavatory, a self-serve bar or kiosk, or a galley.

In some embodiments, the substrate may be a mechanism for actuating an element in a passenger cabin environment.

The present disclosure further provides a method of coating a substrate with an antimicrobial coating including a detectable fluorescent indicator. In embodiments, the method includes providing a substrate, providing an antimicrobial coating solution comprising an antimicrobial component configured to covalently bond to a surface of the substrate and a detectable, water-soluble fluorescent indicator configured to absorb ultraviolet radiation in the 100-415 nm wavelength range and emit radiation in the 100-1000 nm wavelength range, preferably in the 380-740 nm wavelength range, applying the antimicrobial coating solution to the surface of the substrate, and allowing the antimicrobial coating solution to dry on the surface of the substrate to form the antimicrobial coating.

In some embodiments, the method may further include the steps of irradiating the surface of the antimicrobial coated substrate with ultraviolet radiation in the 100-415 nm wavelength range to excite the detectable fluorescent indicator, observing fluorescence corresponding to the excited detectable fluorescent indicator, and confirming, based on the observed fluorescence, at least one of a presence and coverage of the antimicrobial surface coating.

In some embodiments, the step of allowing the antimicrobial solution to dry on the surface of the substrate may include allowing the antimicrobial coating solution to stand on the surface of the substrate for a time duration of at least 6 hours.

In some embodiments, the method may further include the steps of rinsing and drying the surface of the antimicrobial coated substrate.

In some embodiments, the method may further include the step of, in the absence of fluorescence or due to inadequate coverage, reapplying the antimicrobial coating solution to the surface of the substrate.

In some embodiments, the substrate may be associated with a passenger cabin of a conveyance, for instance an aircraft.

In some embodiments, the substrate may be an element of a passenger seat, a passenger suite, a passenger amenity, a control unit, a closet or stowage/luggage bin, a lavatory, a self-serve bar or kiosk, or a galley and/or may correspond to a mechanism for actuating an element in a passenger cabin environment.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
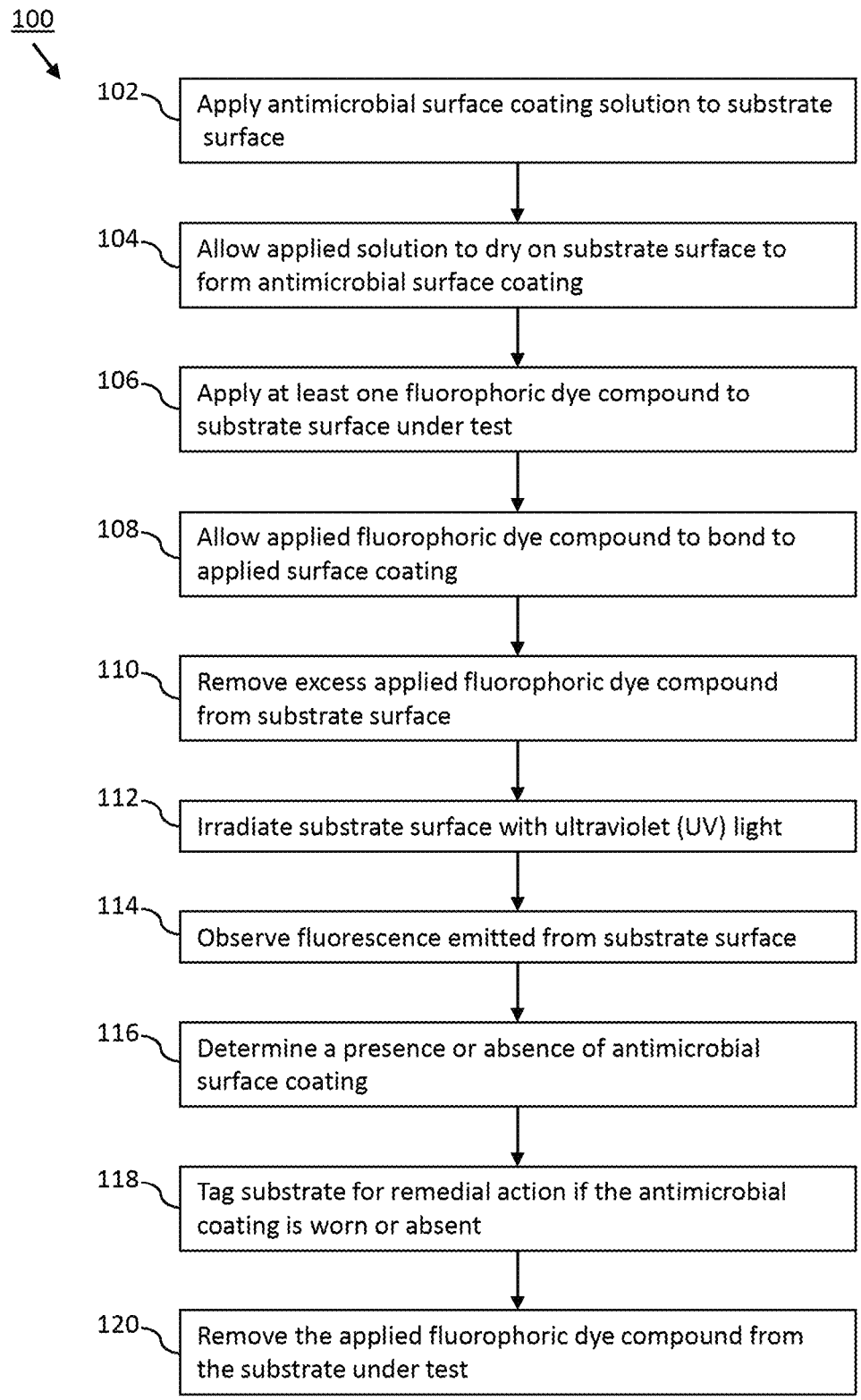
FIG. 1 is a flowchart illustrating a method for applying an antimicrobial surface coating to a substrate and detecting the presence of the coating using a detectable fluorescent indicator.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides embodiments of methods for detecting antimicrobial surface coatings, detectable antimicrobial surface coating solutions, and methods for forming detectable antimicrobial surface coatings.

FIG. 1 illustrates a first method 100 according to the present disclosure. In a step 102, a substrate is provided and an antimicrobial surface coating solution is applied to at least a portion of a surface of the substrate via, for example, a conventional coating process including but not limited to electrostatic spray application, dipping, wiping, or other common application methods. In a step 104, the antimicrobial solution may stand on the surface of the substrate until dry to form the antimicrobial surface coating. In some embodiments, the antimicrobial coating solution may stand on the surface of the substrate for a predetermined time duration, for example, about 30 minutes to about 6 hours to form the antimicrobial surface coating. Excess (e.g., unbonded) antimicrobial surface coating solution may be removed in one or more optional rinsing steps and the coated substrate may be dried in one or more optional drying steps.

In one or more of the embodiments of the present disclosure, the substrate may be any substrate type, for instance a high-contact substrate located in a passenger cabin of a conveyance such as an aircraft. Examples of substrates include, but are not limited to, synthetic or natural fabric surfaces, plastics, metals, composites and composite finishes, wood, glass, leather, and other non-cationic substrates. Substrate environments may include, but are not limited to, passenger cabins, crew quarters, lavatories, and galleys. Other environments may include schools, hospitals, public buildings, etc. In the case of a passenger conveyance, the substrate may be an element of, for example, a passenger seat, a passenger suite, interior panels, luggage bins, doors, walls, passengers amenities, control panels, passenger service units, lavatory fixtures, galley equipment, and beverage carts. In some embodiments, a substrate may be a mechanism operable for manipulating an element, for example, a handle, lock, latch, switch, control panel, etc.

In one or more embodiments of the present disclosure, the antimicrobial coating solution may include a quaternary ammonium compound (QACs, "quats") or other static/non-leachable compound (e.g., silane-functionalized QACs, "SiQuat" or "silquat") configured to attract negatively-charged microorganisms to the surface where the microorganisms are neutralized. To an extent, QACs and other such static compounds may covalently bond to the substrates to which they are applied, resulting in sustainable layers of antimicrobial coatings that may persist for extended periods of time (e.g., 12 months or longer). In some embodiments, the antimicrobial layers may be of no more than nanometer-level thickness, which means that while such antimicrobial or antiviral coatings are invisible under normal conditions, they may be susceptible to wear or erosion due to physical contact.

In a step 106, a tester, for instance a crewmember or maintenance staff, may perform a field assessment of the substrate under test by applying a detectable fluorophoric compound to the substrate surface. For example, the substrate under test (e.g., or a control portion thereof) may be fully or partially immersed in one or more fluorophore-containing solutions (e.g., a solution of 0.05 to 0.28 volume percent in water or alcohol). Alternatively or additionally, the fluorophore-containing solution may be applied to the substrate by a process such as spraying, wiping, and via a pen-type applicator for direct application to the surface. Alternatively, application of a detectable fluorophoric compound may occur within minutes of application of the antimicrobial coating, rather than during field assessment. In a step 108, the fluorophore-containing solution may stand on the surface of the substrate for a predetermined time duration, for example, about 30 seconds up to about 5 minutes, more preferably about 30 seconds up to about 6 hours or more. In a step 110, the substrate surface may be rinsed to remove excess fluorophore-containing solution and then dried. In embodiments, fluorophoric solutions applied to the substrate under test may bond to QACs or other static antimicrobial compounds. In some embodiments, fluorophores may be applied to a control portion of the substrate under test.

In a step 112, the substrate under test having the applied fluorophoric solution is irradiated with ultraviolet radiation in the 100-415 nm wavelength range, more preferably in the 365-415 nm wavelength range, to excite the at least one detectable fluorophoric dye compound. For example, the tester may apply long-wave ultraviolet (UV) light (e.g., "blacklight") to the treated substrate under test. In a step 114, the fluorescence corresponding to the excited fluorophoric dye compound is observed. For example, while the applied fluorophores may be imperceptible under normal visible light (e.g., and therefore may not present as a "stain"), the fluorophores may fluoresce under UV light. In a step 116, a presence or absence, or coverage, of the antimicrobial surface coating is determined based on the observed fluorescence.

For example, areas of the substrate under test where the fluorophores have bonded to antimicrobial QACs fluoresce and therefore are clearly visible under UV light, indicating areas where the antimicrobial coating is present. Similarly, a lack of fluorescence under UV light indicates the absence of an antimicrobial surface coating, for example, attenuated by wear or erosion. In an optional additional step 118, the substrate under test may be flagged for further action, for instance reapplication of the antimicrobial surface coating, servicing, or replacement of the associated substrate, element or component. In an optional step 120, the substrate under test may be washed with an aqueous solution containing sufficient concentrations of cationic species, such as cetyltrimethylammonium chloride or ammonium bicarbonate, to remove the detectable fluorophoric dye compound to 'reactivate' the antimicrobial properties of the underlying QACs or coatings.

In embodiments, the detectable fluorophoric dye compounds may be anionic dye compounds capable of bonding to QACs or other static antimicrobial coatings, e.g., via sulfonate or carboxylic acid functional groups. For example, anionic dye compounds of $\lambda_{ex}<500$ nm and $\lambda_{em}>400$ nm may be ideally invisible under normal visible light and fluoresce under UV light (e.g., Tetrasodium 4,4'-bis[[4-[bis(2-hydroxyethyl)amino]-6-(4-sulphonatoanilino)-1,3,5-triazin-2-yl]amino]stilbene-2,2'-disulphonate], Disodium;5-[[4-anilino-6-[2-hydroxyethyl(methyl)amino]-1,3,5-triazin-2-yl]amino]-2-[2-[4-[[4-anilino-6-[2-hydroxyethyl(methyl)amino]-1,3,5-triazin-2-yl]amino]-2-sulfonatophenyl]ethenyl]benzenesulfonate, Disodium 4,4'-bis(4-anilino-6-morpholino-s-triazin-2-ylamino)-2,2'-stilbenedisulfonate, Disodium;5-[[4-(2-methylanilino)-6-morpholin-4-yl-1,3,5-triazin-2-yl]amino]-2-[2-[4-[[4-(2-methylanilino)-6-morpholin-4-yl-1,3,5-triazin-2-yl]amino]-2-sulfonatophenyl]ethenyl]benzenesulfonate, Hexasodium;2-[[4-[(3-amino-3-oxopropyl)-(2-hydroxyethyl)amino]-6-[4-[2-[4-[[4-[(3-amino-3-oxopropyl)-(2-hydroxyethyl)amino]-6-(2,5-disulfonatoanilino)-1,3,5-triazin-2-yl]amino]-2-sulfonatophenyl]ethenyl]-3-sulfonatoanilino]-1,3,5-triazin-2-yl]amino]benzene-1,4-disulfonate, and related, as well as fluorescein-SA, Lucifer yellow, sulforhodamine-B or sulforhodamine-101, pyranine, HPTS or HPTS(Lys)$_3$, MPTS, CTR, TSPP, TCPP, PTCA).

While the first method 100 is disclosed including both coating formation steps coating detection/identification steps, it is envisioned and intended that the detection/identification steps can be practiced alone in the case of a substrate under test considered to already include an antimicrobial surface coating or a substrate under in which the presence or absence of an antimicrobial surface coating is unknown. For instance, the detection steps can be practiced alone to determine antimicrobial coating presence, coverage area, wear, etc., for the purpose of determining the need for coating, recoating, spot-coating, replacement, etc. Further, the recited rinsing, washing and drying steps can be optional or additional rinsing, washing and drying steps can be performed. Coating application, dye compound application, rinsing, washing and drying procedures may vary depending on the substrate type, coating type, fluorophoric dye compound type, substrate location, and testing environment, among other factors. The foregoing is applicable to the recited method 100 and methods discussed further below.

Figure 2:
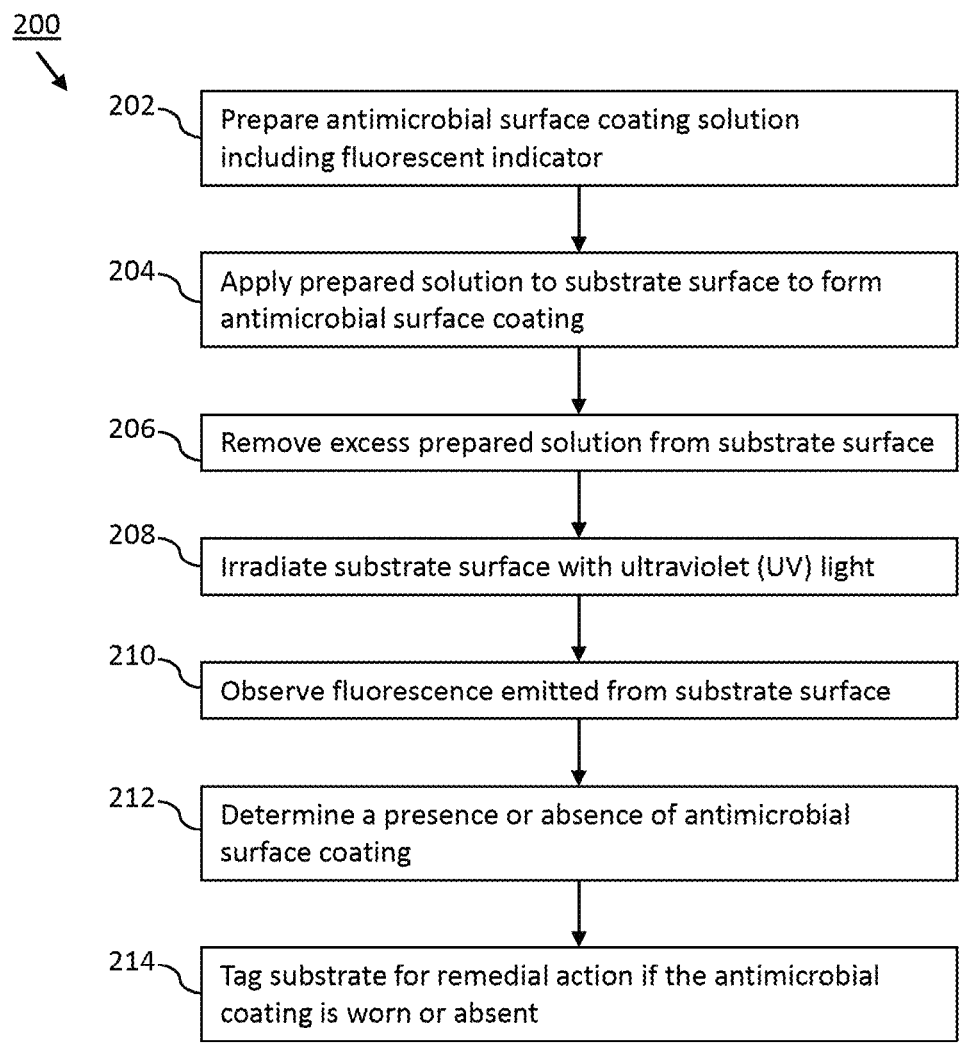
FIG. 2 is a flowchart illustrating a method for forming an antimicrobial surface coating including a detectable fluorescent indicator, and detecting the formed antimicrobial surface coating using the detectable fluorescent indicator.

FIG. 2 illustrates a second method 200 according to the present disclosure. Broadly speaking, the second method 200 includes the steps of preparing an antimicrobial surface coating solution including a detectable fluorescent indicator component, coating a substrate with the prepared solution to form an antimicrobial surface coating, and detecting the presence or absence of the applied antimicrobial surface coating. In some embodiments, the antimicrobial surface coating solution may include an antimicrobial component and a detectable, water-soluble fluorescent indicator provided as a mixture to be coated on a substrate to impart antimicrobial properties to the coated substrate. In some embodiments, the solution may be a water-based or alcohol-based solution.

In a step 202, an antimicrobial surface coating solution is prepared including at least a quaternary ammonium compound or other static/non-leachable compound and a detectable fluorescent indicator. In some embodiments, fluorescent indicators according to the present disclosure may include any fluorescent compound capable of absorption in the UV spectrum and emission in the visible spectrum. For example, the fluorescent compound may absorb radiation in the 100-

415 nm wavelength range, more preferably in the 300-415 nm wavelength range, and most preferably in the 365-415 nm wavelength range, and emit radiation in the 100-1000 nm wavelength range, more preferably emit visible light in the 380-740 nm wavelength range. Suitable fluorescent compounds may be transparent in the presence of visible light and uncolored so as not to alter the color and/or transparency of the coating. Suitable fluorescent compounds can include, but are not limited to, commercially available fluorescent dyes, pigments, colorants and brighteners. A specific, non-limiting example of a suitable fluorescent compound can include 5-[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl] benzenesulfonate.

In a step 204, the prepared solution is applied to the predetermined substrate and allowed to stand on the surface of the substrate until dry to form the antimicrobial surface coating. In some embodiments, the antimicrobial coating solution may be allowed to stand on the surface of the substrate for a predetermined time duration, for example, at least about 6 hours to form the antimicrobial surface coating. In an optional step 206, the coated substrate may be rinsed or wiped to remove excess surface coating solution and subsequently dried.

In a step 208, the substrate under test having the formed surface coating is irradiated with ultraviolet radiation, for example, in the 100-415 nm wavelength range, more preferably in the 365-415 nm wavelength range, to excite the detectable fluorescent indicator. For example, UV light may be directed to the substrate under test. In a step 210, the fluorescence corresponding to the excited fluorescent indicator is observed. In a step 212, a presence or absence, or coating coverage, of the antimicrobial surface coating is determined based on the observed fluorescence. For example, areas of the substrate that fluoresce are indicative of bonded antimicrobial surface coating, while areas of the substrate that do not fluorescence are indicative of uncoated substrate.

In some embodiments, the determination step 212 may include comparing the intensity of fluoresce to a predetermined threshold value and/or compared to a control area known to be coated or known to lack a coating. In some embodiments, intensity level data for a particular substrate may be saved for comparison against future data to track wear and/or coating performance. In some embodiments, the methods disclosed herein can be used to determine the level of coating wear between areas of a substrate by comparing the level of fluorescent intensity between different predetermined areas. For example, obtained data can be used to determine frequent touchpoints that may require more frequent recoating, more robust coating, and/or additional coating layers. In an optional additional step 214, the substrate under test may be flagged for further action, for instance reapplication of antimicrobial surface coating, servicing or replacement of the associated substrate, element or component.

Methods according to the present disclosure can be used to verify the presence or absence of an antimicrobial coating, for example, to verify the application and quality of the coating during manufacturing, and/or detect wear in the coating during service. In some embodiments, the method includes providing a substrate coated with an antimicrobial surface coating containing a fluorescent indicator, exposing the coated substrate to UV light to excite the fluorescent indicator, and observing the presence or absence of fluorescence to detect coating presence and wear. In further embodiments, the method may include measuring the intensity of fluorescence across a coated substrate exposed to UV light and comparing the measured intensity to predefined threshold values corresponding to predefined wear indicators. Collected data may be analyzed to determine coating performance, compare performance between substrates, measure usage and wear, etc.

Figure 3:
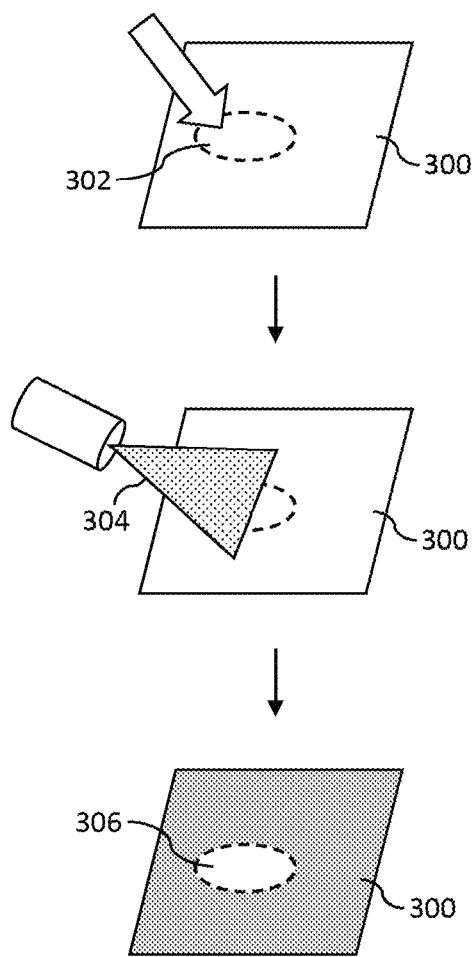
FIG. 3 illustrates schematically the implementation of the disclosed methodologies to determine a presence or absence of an antimicrobial surface coating.

FIG. 3 shows schematically a substrate 300 under test, a detectable fluorescent indicator 302 (e.g., provided as an applied fluorophoric compound according to the first method 100 or as a component of the formed antimicrobial surface coating according to the second method 200), application of the appropriate radiation 304 to be absorbed by the fluorescent indicator 302, and emission of light in the visible spectrum 306 indicating the presence of an antimicrobial surface coating.

Antimicrobial surface coatings according to the present disclosure find widespread application in the field of antimicrobials and may be used to surface treat any substrate benefitting from the advantages of an antimicrobial surface coating.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

What is claimed is:

1. A method for detecting a presence or an absence of an antimicrobial surface coating, comprising the steps of:
    providing a substrate;
    pre-treating the substrate with an antimicrobial surface coating solution comprising an antimicrobial component configured to covalently bond to the substrate, wherein the antimicrobial surface coating solution does not comprise a detectable fluorophoric dye compound;
    separately applying a detectable fluorophoric dye compound to a surface of the substrate at a time after the step of pre-treating the substrate;
    irradiating the surface of the substrate with ultraviolet radiation in a 100-415 nm wavelength range to excite the detectable fluorophoric dye compound;
    observing fluorescence corresponding to the excited detectable fluorophoric dye compound; and
    determining, based on the observed fluorescence, the presence or the absence of the antimicrobial surface coating;
    wherein the determining step comprises obtaining fluorescence intensity data and comparing the obtained fluorescence intensity data to at least one of predetermined threshold intensity data and intensity data of a control area of the substrate known to be coated with an antimicrobial surface coating or known to lack an antimicrobial surface coating.

2. The method according to claim 1, wherein the step of applying the detectable fluorophoric dye compound to the surface of the substrate comprises:
    depositing the detectable fluorophoric dye compound on the surface of the substrate;
    allowing the detectable fluorophoric dye compound to stand on the surface of the substrate for a predetermined time duration;

removing excess deposited detectable fluorophoric dye compound from the surface of the substrate; and drying the surface of the substrate.

3. The method according to claim 1, wherein the detectable fluorophoric dye compound is provided in a water-based or alcohol-based solution.

4. The method according to claim 1, wherein the substrate is located in a passenger cabin of a conveyance.

5. The method according to claim 4, wherein the substrate is an element of a passenger seat, a passenger suite, a passenger amenity, a control unit, a stowage/luggage bin, a self-service bar or kiosk, a lavatory, or a galley.

6. The method according to claim 4, wherein the substrate is part of a mechanism for actuating an element in a passenger cabin environment.

\* \* \* \* \*